United States Patent [19]

Harris

[11] Patent Number: 5,219,427

[45] Date of Patent: Jun. 15, 1993

[54] CLEVIS PIPE HANGER

[75] Inventor: Glenn A. Harris, Henderson, Tenn.

[73] Assignee: Grinnell Corporation, Exeter, N.H.

[21] Appl. No.: 875,689

[22] Filed: Apr. 29, 1992

[51] Int. Cl.[5] .............................................. E21F 17/02
[52] U.S. Cl. ....................................... 248/59; 248/62
[58] Field of Search ........................ 248/59, 62, 58, 49

[56] References Cited

U.S. PATENT DOCUMENTS

| | | |
|---|---|---|
| 2,466,247 | 4/1949 | Land . |
| 2,835,464 | 5/1958 | Kolodin .............................. 248/62 |
| 2,923,509 | 2/1960 | Kolodin .............................. 248/62 |
| 3,051,424 | 8/1962 | Duhamel . |
| 3,162,112 | 12/1964 | Wheeler ........................... 248/62 X |
| 3,185,758 | 5/1965 | Litz .................................. 248/62 X |
| 3,208,560 | 9/1965 | Cote . |
| 3,415,474 | 12/1968 | Kindorf . |
| 3,652,045 | 3/1972 | Hirt .................................... 248/62 |
| 4,019,706 | 4/1977 | Weiland, Sr. ...................... 248/62 |
| 4,943,016 | 7/1990 | Hennecke ........................ 248/62 X |
| 5,009,386 | 4/1991 | Berger et al. ........................ 248/59 |

OTHER PUBLICATIONS

PHD Manufacturing, Inc. Price List and Catalog, "Pipe Hangers and Devices", 1974.
Carpenter and Peterson, Inc. Catalog 58, p. 4, "Witch Pipe Hangers", approx. 1975, MA.
L. K. Pipe Hanger Company, Inc. Price List No. 14, p. 18, "Pipe Hangers and Supports", 1981, NJ.
Michigan Hanger Co., Inc. Catalog 40M, pp. 3, 35, 1985, OH.
B-Line Systems Catalog, pp. 44-45, "Pipe Hangers", 1987, IL.
Piping Specialties, Inc. Catalog No. 450, p. 1, "Pipe Hangers", Last Published 1988, NJ.
Gulf State Hangers Catalog, 1990.
I.H.L. Catalog, 1990.
Power Piping Company Catalog, p. E2, 1990.
"Pipe Clamps, Clamp Bases '90", 1990.
Empire Tool and Manufacturing Co., Inc. Catalog No. 8A, p. 13, Last published 1991.
Globe Pipe Hanger Products, Inc. Catalog and Price List No. 911, p. 6, 1991, OH.

*Primary Examiner*—Ramon O. Ramirez
*Attorney, Agent, or Firm*—Fish & Richardson

[57] ABSTRACT

A clevis pipe hanger having upper and lower yokes and a clevis bolt or stud defines a pipe support aperture with an inner diameter of predetermined range, measured along a horizontal plane through the center axis of the pipe and parallel to the axis of the clevis bolt, that is greater than the predetermined distance between opposed, inner surfaces of the ends of the upstanding arms of the lower yoke, whereby, in the regions near and below the horizontal plane, the inner surface of the lower yoke engages the outer surface of the pipe. In the regions above the horizontal plane, segments of the inner surfaces of the upstanding arms lie generally tangent to the outer surface of the pipe and extend generally toward each other. In the region of the arms lie approximately parallel to each other.

7 Claims, 3 Drawing Sheets

CLEVIS PIPE HANGER

BACKGROUND OF THE INVENTION

The invention relates to devices for pendent support of piping, and, more particularly, to clevis or yoke-and-saddle type pipe hangers.

Piping installed along ceilings and the like is often supported by a series of pipe hangers. Each hanger is engineered to support a predetermined weight of pipe and contents, and the arrangement of pipe and hangers are specified accordingly, with a built-in safety factor. During installation, the vertical positions of the individual pipe hangers are adjusted to ensure that, at least initially, the weight of the piping is properly distributed, with each pipe hanger bearing its full portion of the load of pipe and contents. Also, in many instances, the piping must be set at a predetermined pitch to facilitate proper drainage or flow.

It is important, for reasons of both safety and operation, that each pipe hanger have the capability to maintain, over time, its portion of the supported piping at the predetermined position and attitude, without shifting or sagging in a manner that would cause other pipe hangers to bear an out-of-limits portion of the load. Others have proposed means for addressing this problem. For example, Hirt U.S. Pat. No. 3,652,045 suggested formation of lugs on the clevis bolt to prevent the upper ends of the arms of the saddle or lower yoke from shifting inwardly thus increasing shear forces inward from the ends of the bolt and causing the hanger to sag.

Often, the concern of preventing sagging of the hanger has been addressed by use of materials that are capable of adequately supporting piping of far greater weight in order to ensure that sagging or other problems will not occur. However, a second, somewhat competing factor is that construction projects often require use of vast numbers of pipe hangers and use of a product over-engineered by even a few cents per unit can represent a significant, unnecessary expense.

SUMMARY OF THE INVENTION

According to the invention, a clevis pipe hanger comprises an inverted, generally U-shaped upper yoke element having a first downpending arm portion, a second downpending arm portion, and a generally horizontal center portion therebetween, a generally U-shaped lower yoke element having a first upstanding arm portion and a second upstanding arm portion, and a clevis bolt. The first and second downpending arm portions, and the first and second upstanding arm portions each define an aperture. The first downpending arm portion and the first upstanding arm portion are disposed in adjacent, overlapping relationship with the respective apertures thereof disposed in approximate alignment, and the second downpending arm portion and the second upstanding arm portion are similarly disposed in adjacent, overlapping relationship with the respective apertures thereof disposed in approximate alignment. The clevis bolt, which defines a clevis bolt axis, extends through the apertures of the first downpending arm portion and the first upstanding arm portion and through the apertures of the second upstanding arm portion and the second downpending arm portion. Opposed, inner surfaces of the first upstanding arm portion and the second upstanding arm portion in a region along the clevis bolt axis are spaced apart by a predetermined distance. The lower yoke element has an inner surface and defines a support aperture for receiving and supporting a pipe of an outer diameter of a predetermined range measured at a horizontal plane extending through a center axis of the pipe. The support aperture, bearing a pipe, has an inner diameter of a predetermined range measured along the horizontal plane, parallel to the clevis bolt axis, that is greater than the predetermined distance between the opposed, inner surfaces of the first upstanding arm portion and the second upstanding arm portion. In regions near and below the horizontal plane, the inner surface of the lower yoke element engage the outer surface of the pipe. In regions above the horizontal plane, segments of the inner surfaces of the first upstanding arm portion and the second upstanding arm portion of the lower yoke element lie generally tangent to the outer surface of the pipe and extend generally inwardly toward each other. In the region of the clevis bolt, the opposed inner surfaces of the upstanding arm portions lie approximately parallel to each other.

Preferred embodiments of the invention may include one or more of the following features. In the region along the clevis bolt axis, the first and second upstanding arm portions are disposed inwardly of the first and second downpending arm portions. The center portion of the upper yoke element defines an aperture, and the clevis pipe hanger further comprises a support rod, the support rod extending through the aperture and the upper yoke element being adapted for fixed adjustment along the support rod, means for adjusting the position of the upper yoke element along the support rod, and means for fixing the position of the upper yoke element along the support rod. Preferably, the support rod has a threaded portion extending through the aperture of the center portion of the upper yoke element, the means for adjusting comprises a first threaded nut disposed about the support rod below the upper yoke element and adapted to engage upon a lower surface of the yoke element, and the means for fixing comprises a second threaded nut disposed about the support rod above the upper yoke element and adapted to engage upon an upper surface of the yoke element. During installation, opposed inner surfaces of the first upstanding arm portion and the second upstanding arm portion extending generally toward each other above the horizontal plane are disposed to bear upon pipe surfaces above the horizontal plane in a manner to support the lower yoke element in an upright position extending above the pipe prior to completing assembly of the clevis pipe hanger to the support rod.

In another embodiment, the clevis pipe hanger further comprises a sleeve of predetermined length disposed about the clevis bolt, the sleeve defining a first shoulder and a second, opposite shoulder along the clevis bolt, the shoulders being spaced apart by about the predetermined distance between the first upstanding arm portion and the second upstanding arm portion, the first shoulder having an outer diameter greater than the diameter of the aperture in the first upstanding arm portion and the second shoulder having an outer diameter greater than the diameter of the aperture in the second upstanding arm portion.

The clevis bolt in either of the embodiments described above may be replaced by a clevis stud having threads at opposite ends, with a first nut fastenable upon the threads at a first end extending through the first upstanding arm portion and the first downpending arm portion and a second nut fastenable upon the threads at a second end extending through the second upstanding arm portion and the second downpending arm portion, the first nut having an outer diameter greater than the diameter of the aperture in the first downpending arm portion and the second nut having an outer diameter greater than the diameter of the aperture in the second downpending arm portion.

The objectives of this invention include providing a clevis pipe hanger which minimizes the weight of materials while preventing undo or significant sagging of the saddle. In particular, this objective is achieved by predisposing the inner surfaces of the upstanding arm portions of the lower yoke element inward of the outer surface of the pipe at a horizontal plane extending through the center axis of the pipe, and by locating the downpending arm portions of the upper yoke element in adjacent, outward, overlapping relationship with the upstanding arm portions, thus to minimize vertical deflection of the clevis pipe hanger due, e.g., to the combination of (1) stretching of the arms and (2) the tendency for the upstanding arms to slide inwardly along the axis of the clevis bolt due to downwardly arcuate bending of the clevis bolt, under the load of the pipe and its contents.

The objective of the invention further include providing means for helping to support the lower yoke element in an upright position, extending above the pipe, prior to complete assembly with the support rod, as a convenience to the installer. This further objective is achieved by orientation of segments of inner surfaces of the first and second upstanding arm portions of the lower yoke element generally tangent to the outer surface of the pipe in the regions above the horizontal plane through the center axis of the pipe.

These and other features and advantages will be seen from the following description of a presently preferred embodiment, and from the claims.

BRIEF DESCRIPTION OF THE DRAWINGS

We first briefly describe the drawings.

DETAILED DESCRIPTION OF THE PREFERRED EMBODIMENTS

Figure 5:
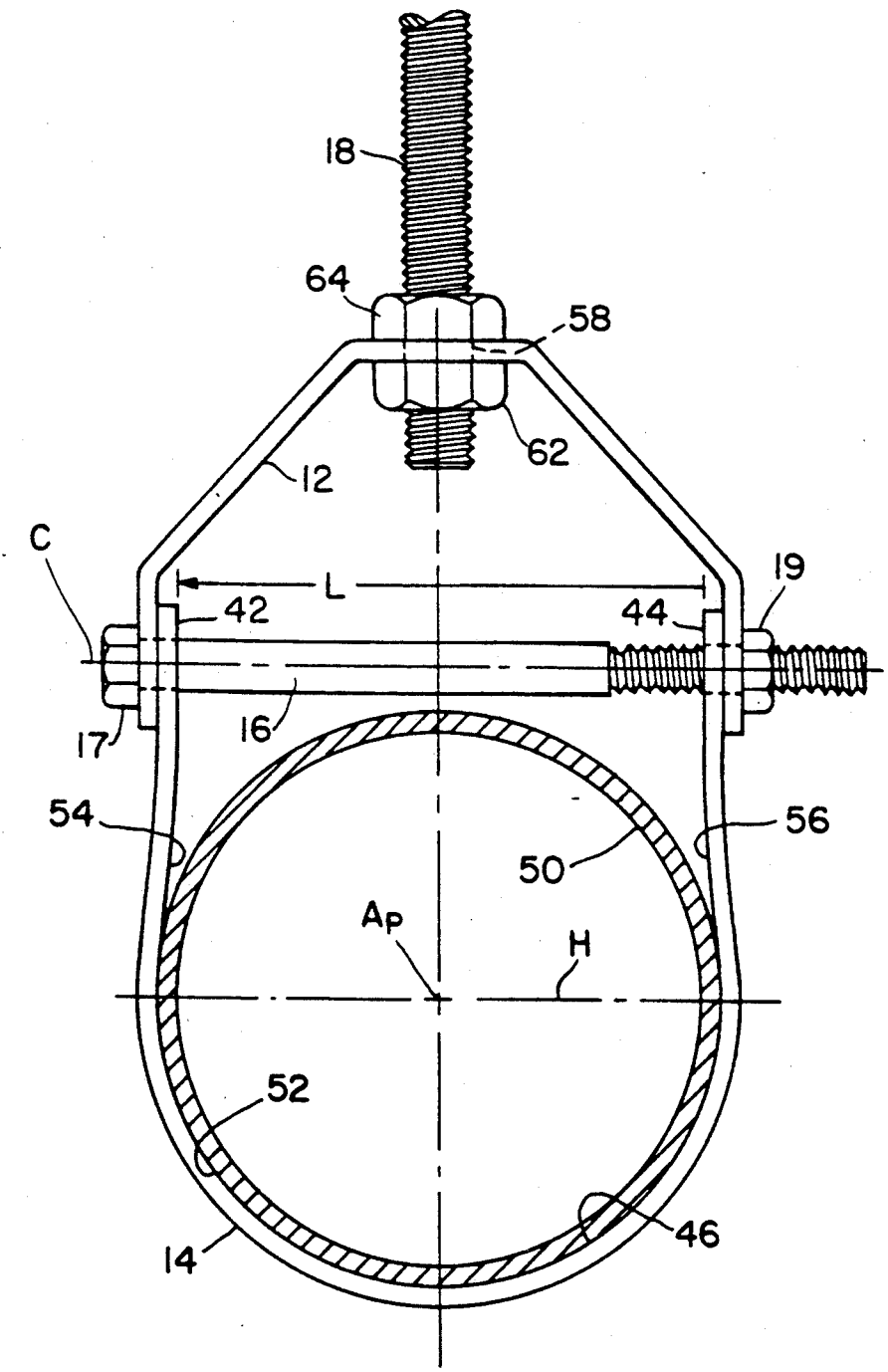
FIG. 5 is an elevation view of a pipe in cross section with pendant support provided by a pipe hanger of the invention.

Referring to the drawings, a pipe hanger 10 of the invention consists of an inverted, generally U-shaped upper yoke element 12, a generally U-shaped lower yoke element 14, a clevis bolt 16 and a support rod 18 (FIG. 5).

The upper yoke element 12 has a first downpending arm portion 20, a second downpending arm portion 22 and a generally horizontal center portion 24 therebetween. The first downpending arm has an aperture 26 and the second downpending arm portion has a similar aperture 28.

The lower yoke element 14 has a first upstanding arm portion 30 and a second upstanding arm portion 32, each also having an aperture 34, 36, respectively.

Figure 1:
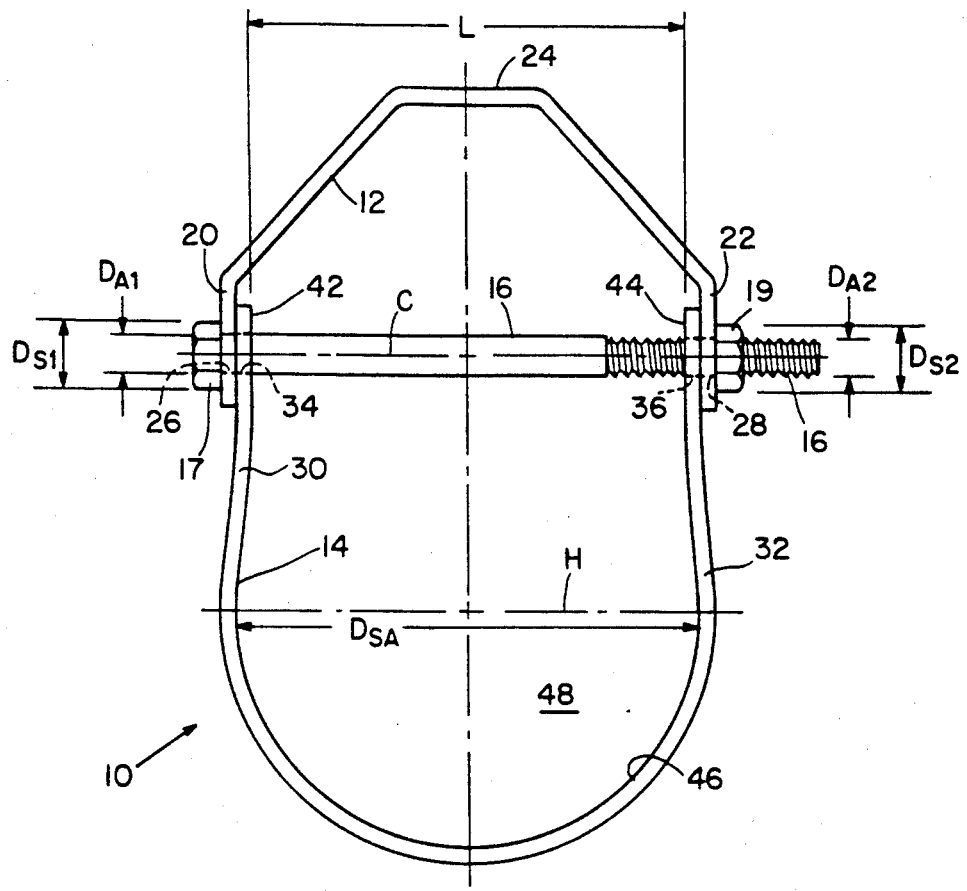
FIG. 1 is an elevation view of a pipe hanger of the invention.
Figure 2:
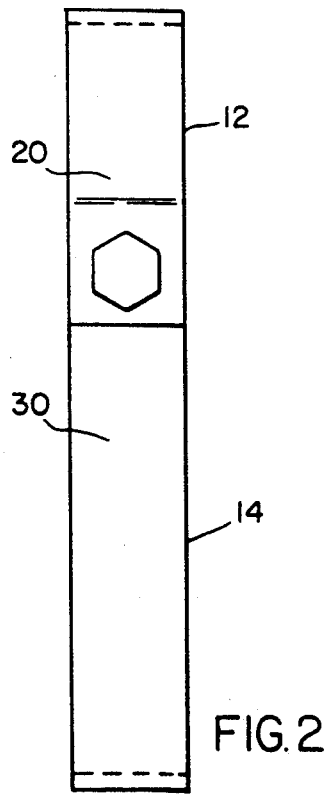
FIG. 2 is a side view of the pipe hanger of FIG. 1.
Figure 3:
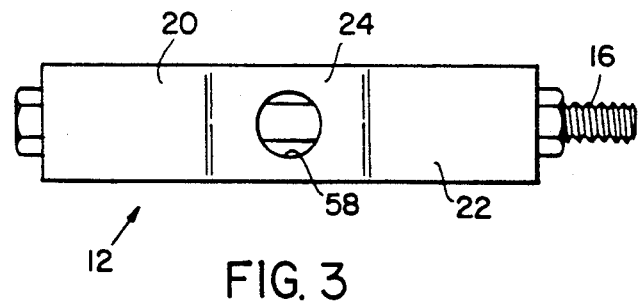
FIG. 3 is a top view of the pipe hanger of FIG. 1.
Figure 4:
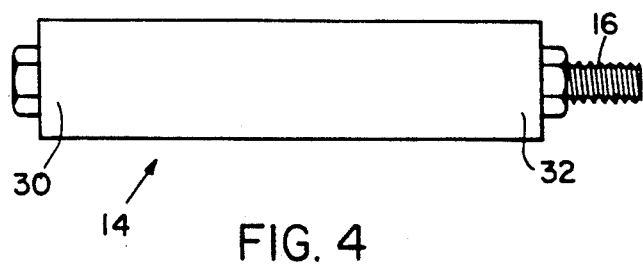
FIG. 4 is a bottom view of the pipe hanger of FIG. 1.

The first downpending arm portion 20 and the first upstanding arm portion 30 are disposed in adjacent, generally overlapping relationship, with the respective apertures 26, 34 thereof disposed approximately in alignment. The second downpending arm portion 22 and the second upstanding arm portion 32 are also disposed in adjacent, generally overlapping relationship with the respective apertures 28, 36 thereof also disposed approximately in alignment. As seen in FIG. 1, in the region along the clevis bolt axis, C, the ends of the first and second upstanding arm portions 30, 32 are disposed inwardly of the ends of the first and second downpending arm portions 20, 22.

The clevis bolt 16 extends through the apertures 26, of the downpending arm portion 20 and first upstanding arm portion 30 and through the apertures 36, 28 of the second upstanding arm portion 32 and second downpending arm portion 22, with the clevis bolt defining a clevis bolt axis, C. The opposed, inner surfaces 42, 44 of the first upstanding arm portion and the second upstanding arm portion, respectively, in a region of the clevis bolt axis, are spaced apart by a predetermined distance, L. The head 17 of the clevis bolt 16 and the threaded clevis bolt nut 19 have outer diameters greater than the diameters of the respective apertures 26, 28 in the first and second downpending arm portions 20, 22.

The lower yoke element 14 has an inner surface 46 in which there is formed a support aperture 48 for receiving and supporting a pipe 50 of outer diameter, $D_P$, of a predetermined range, measured at a horizontal plane, H, extending through a center axis, $A_P$, of the pipe. The support aperture, bearing the pipe, has an inner diameter, $D_{SA}$, also of a predetermined range, measured along the horizontal plane, H, parallel to the clevis bolt axis, C, that is greater than the predetermined distance, L, between the opposed, inner surfaces 42, 44 of the first and second upstanding arms 30, 32. The inner surface of the lower segment 46 of the lower yoke element 14 engages the outer surface 52 of the pipe 50 near and below the horizontal plane of the axis of the pipe 50. In regions above the horizontal plane, inner surface segments 54, 56 of the first upstanding arm portion 30 and of the second upstanding arm portion 32 lie generally tangent to the outer surface 52 of the pipe 50 and extend generally inwardly toward each other until the region of the clevis bolt, where the inner surface 42 of the first upstanding arm portion 30 and the inner surface 44 of the second upstanding arm portion 32 are generally parallel to each other.

By this arrangement, under load, the tendency for the upstanding arm portions to slide inwardly along the axis of the clevis bolt is restrained, in part by the relationship of the diameter of the pipe surface 52 measured along the horizontal plane, H, to the relatively smaller distance, L, between the ends of the upstanding arm portions 30, 32, which causes the ends of the upstanding arm portions 30, 32 of the lower yoke element 14 to be held outwardly, along the clevis bolt axis, C, close to the ends of the downpending arm portions 20, 22, secured by the clevis bolt. The load of the pipe and its contents is thus spread along the clevis bolt axis, away from the center region, and the tendency for downward arcuate bending of the clevis bolt under load is similarly reduced.

The horizontal center portion 24 of the upper yoke element 12 defines an aperture 58 through which there extends a threaded support rod 18. A threaded nut 62 disposed about the support rod below the upper yoke element is adapted to be adjusted vertically along the support rod, in engagement with a lower surface of the yoke element, for adjusting the vertical position of the pipe hanger 10. A second threaded nut 64 disposed about the support rod above the upper yoke element is adapted to engage upon the upper surface of the yoke element to fix the vertical position of the pipe hanger.

As a result of this cooperative engagement of the inner surface of the lower yoke element or saddle along the outer surface of the pipe disposed within the support aperture, with the inner surface of the yoke lying generally tangent to the surface of the pipe in regions near and below a horizontal plane through the center axis of the pipe, and the segments 54, 56 of the arms 30, 32 above those regions extending inwardly towards one another, the saddle is prevented from sagging significantly, thus not requiring use of materials that have unnecessarily high weight.

Also, during installation, the relationship of the first upstanding arm portion 30 and the second upstanding arm portion 32 in the clevis pipe hanger 10 of the invention, with those arm portions extending generally toward each other above the horizontal plane, results in the inner surfaces of the arms bearing upon pipe surfaces above the horizontal plane, H, in a manner to help support the lower yoke element 14 in an upright position extending above pipe 50 prior to the complete assembly of the clevis pipe hanger 10.

Other embodiments are within the following claims. For example, referring to FIG. 6, in another embodiment of a clevis pipe hanger of the invention, in particular for use with pipe of large diameter, e.g. 30 inches or greater, a sleeve 70 is disposed about the clevis bolt 16, the sleeve defining a first end or shoulder 72 and a second, opposite end or shoulder 74 which are spaced apart along the clevis bolt axis by the predetermined length, S, which is about equal to the distance, L, between the inside surfaces of the first upstanding arm portion 30 and the second upstanding arm 32 portion. The first end or shoulder 72 has an outer diameter, $D_{S1}$, which is greater than the diameter, $D_{A1}$, of the aperture 34 in the first upstanding arm portion 30 and the second end or shoulder 74 has an outer diameter, $D_{S2}$, which is greater than the diameter, $D_{A2}$, of the aperture 36 in the second upstanding arm portion 32.

Figure 6:
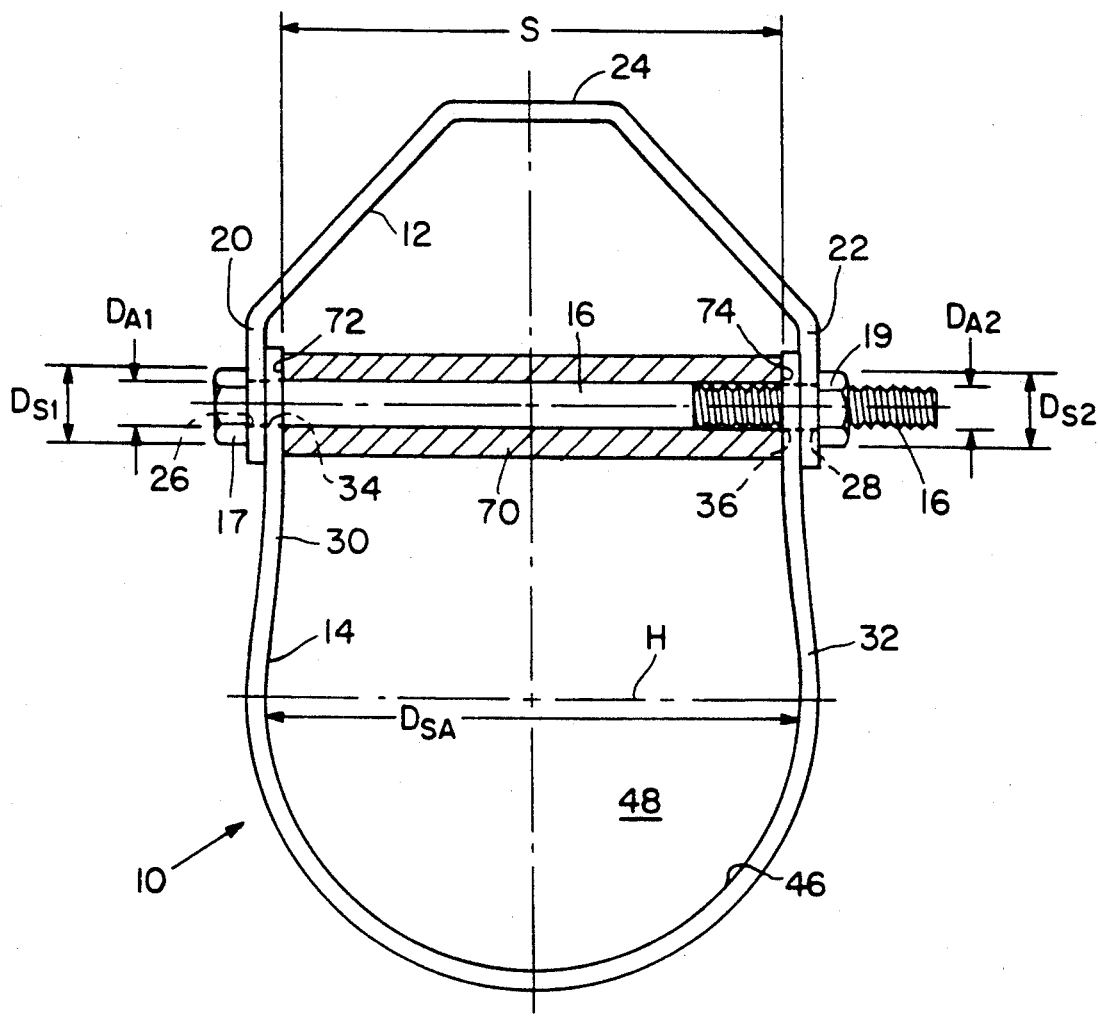
FIG. 6 is an elevation view of another embodiment of a pipe hanger of the invention with optional sleeve.
Figure 6A:
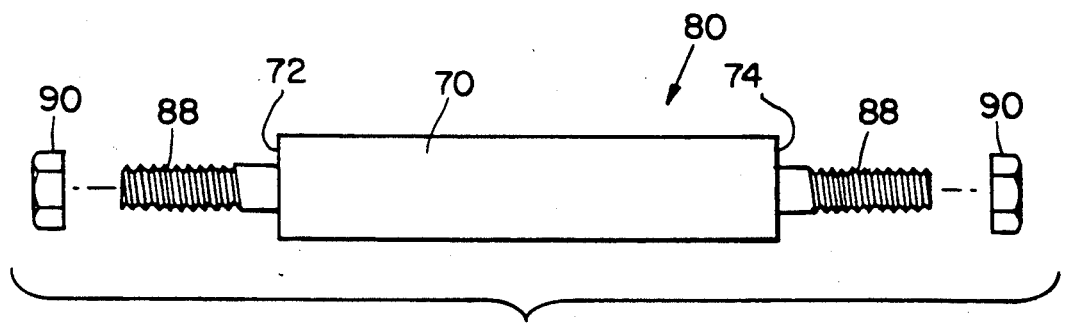
FIG. 6A is a plan view of a clevis stud for use in the pipe hanger of FIGS. 1 or 6.

Also, in place of the clevis bolt 16, in the embodiments of FIG. 1 or FIG. 6, there may be provided a clevis stud 80 (FIG. 6A) having threads 88 at each end for receiving nuts 90. Each nut 90 has a outer diameter greater than the diameters of the respective apertures 26, 28 in the first and second downpending arm portions 20, 22.

What is claimed is:

1. A clevis pipe hanger comprising
   an inverted, generally U-shaped upper yoke element having a first downpending arm portion, a second downpending arm portion, and a generally horizontal center portion therebetween,
   said first downpending arm portion and said second downpending arm portion each defining an aperture,
   a generally U-shaped lower yoke element having a first upstanding arm portion and a second upstanding arm portion,
   said first upstanding arm portion and said second upstanding arm portion each defining an aperture,
   said first downpending arm portion and said first upstanding arm portion disposed in adjacent, overlapping relationship with the respective apertures thereof disposed in approximate alignment, and
   said second downpending arm portion and said second upstanding arm portion disposed in adjacent, overlapping relationship with the respective apertures thereof disposed in approximate alignment,
   a clevis bolt extending through the apertures of said first downpending arm portion and said first upstanding arm portion and through the apertures of said second upstanding arm portion and said second downpending arm portion,
   said clevis bolt defining a clevis bolt axis, and
   opposed, inner surfaces of said first upstanding arm portion and said second upstanding arm portion in a region along said clevis bolt axis being spaced apart by a predetermined distance,
   said lower yoke element having an inner surface and defining a support aperture for receiving and supporting a pipe of an outer diameter of a predetermined range measured at a horizontal plane extending through a center axis of the pipe,
   said support aperture, for bearing a pipe, having an inner diameter of a predetermined range measured along said horizontal plane, parallel to said clevis bolt axis, that is greater than said predetermined distance between said opposed, inner surfaces of said first upstanding arm portion and said second upstanding arm portion,
   in regions near and below said horizontal plane, said inner surface of said lower yoke element engaging the outer surface of the pipe,
   in regions above aid horizontal plane, segments of the inner surfaces of said first upstanding arm portion and said second upstanding arm portion of said lower yoke element lying generally tangent to the outer surface of the pipe and extending generally inwardly toward each other, and,
   in regions of said clevis bolt axis, said inner surfaces of said first upstanding arm portion and said second upstanding arm portion of said lower yoke element lying approximately parallel to each other.

2. The clevis pipe hanger of claim 1 wherein, in said region along said clevis bolt axis, said first and second upstanding arm portions are disposed inwardly of said first and second downpending arm portions.

3. The clevis pipe hanger of claim 1 wherein said center portion of said upper yoke element defines an aperture, and said clevis pipe hanger further comprises a support rod, said support rod extending through said aperture and said upper yoke element being adapted for fixed adjustment along said support rod, means for adjusting the position of the upper yoke element along said support rod, and means for fixing the position of the upper yoke element along said support rod.

4. The clevis pipe hanger of claim 3 wherein said support rod has a threaded portion extending through said aperture of said center portion of the upper yoke element, said means for adjusting comprises a first threaded nut disposed about said support rod below said upper yoke element and adapted to engage upon a lower surface of said yoke element, and said means for fixing comprises a second threaded nut disposed about said support rod above said upper yoke element and adapted to engage upon an upper surface of said yoke element.

5. The clevis pipe hanger of claim 1 wherein, during installation, opposed segments of said inner surfaces of said first upstanding arm portion and sad second upstanding arm portion extending generally toward each other above said horizontal plane are disposed to ear upon pipe surfaces above said horizontal plane in a manner to support said lower yoke element in an upright position extending above said pipe prior to complete assembly of said clevis pipe hanger.

6. The clevis pipe hanger of claim 1 further comprising a sleeve of predetermined length disposed about said clevis bolt, said sleeve defining a first shoulder and a second, opposite shoulder along said clevis bolt, said shoulders being spaced apart by about said predetermined distance between said first upstanding arm portion and said second upstanding arm portion, said first shoulder having an outer diameter greater than the diameter of the aperture in said first upstanding arm portion and said second shoulder having an outer diameter greater than the diameter of the aperture in said second upstanding arm portion.

7. The clevis pipe hanger of claim 1 or 6 wherein said clevis bolt comprises a clevis stud having threads at opposite ends, with a first nut fastenable upon said threads at a first end extending through said first upstanding arm portion and said first downpending arm portion and a second nut fastenable upon said threads at a second end extending through said second upstanding arm portion and said second downpending arm portion, said first nut having an outer diameter greater than the diameter of the aperture in said first downpending arm portion and said second nut having an outer diameter greater than the diameter of the aperture in said second downpending arm portion.

* * * * *

UNITED STATES PATENT AND TRADEMARK OFFICE
CERTIFICATE OF CORRECTION

PATENT NO.   : 5,219,427

DATED        : June 15, 1993

INVENTOR(S)  : Glenn A. Harris

It is certified that error appears in the above-identified patent and that said Letters Patent is hereby corrected as shown below:

Title page, item [57], col. 2,
In the Abstract:

Line 13, please insert the following missing line between "of the" and "arms" --clevis bolt, the opposed inner surfaces of the upstanding--.

Col. 4, line 18; insert --34-- before "of the".

Col. 4, line 34; delete new paragraph.

Signed and Sealed this

Twenty-sixth Day of April, 1994

*Attest:*

BRUCE LEHMAN

*Attesting Officer*     Commissioner of Patents and Trademarks